(12) United States Patent
Gagnon et al.

(10) Patent No.: US 9,177,293 B1
(45) Date of Patent: Nov. 3, 2015

(54) SPAM FILTERING SYSTEM AND METHOD

(75) Inventors: Jean Gagnon, Vankleek Hill (CA); Paul J. Lagassey, Vero Beach, FL (US)

(73) Assignee: Cousins Intellectual Properties LLC, Vero Beach, FL (US)

( * ) Notice: Subject to any disclaimer, the term of this patent is extended or adjusted under 35 U.S.C. 154(b) by 1618 days.

(21) Appl. No.: 11/780,694

(22) Filed: Jul. 20, 2007

Related U.S. Application Data (60) Provisional application No. 60/820,022, filed on Jul. 21, 2006.

(51) Int. Cl.
  *G06F 15/16* (2006.01)
  *G06Q 10/10* (2012.01)
  *H04L 12/58* (2006.01)

(52) U.S. Cl.
  CPC ............. *G06Q 10/107* (2013.01); *H04L 51/12* (2013.01)

(58) Field of Classification Search
  CPC ............................ G06Q 10/107; H04L 12/585
  USPC ......................................................... 709/206
  See application file for complete search history.

(56) References Cited

U.S. PATENT DOCUMENTS

| | | | |
|---|---|---|---|
| 6,199,102 B1 * | 3/2001 | Cobb ............................ | 709/206 |
| 6,691,156 B1 * | 2/2004 | Drummond et al. .......... | 709/206 |
| 7,149,801 B2 * | 12/2006 | Burrows et al. ............... | 709/225 |
| 7,529,802 B2 * | 5/2009 | Nelson et al. ................. | 709/206 |
| 7,587,368 B2 * | 9/2009 | Felsher ........................... | 705/65 |
| 2004/0015554 A1 * | 1/2004 | Wilson .......................... | 709/206 |
| 2008/0168145 A1 * | 7/2008 | Wilson .......................... | 709/206 |

* cited by examiner

*Primary Examiner* — Ranodhi Serrao
*Assistant Examiner* — Thomas Richardson
(74) *Attorney, Agent, or Firm* — Steven M. Hoffberg, Esq.; Ostrolenk Faber LLP (57) ABSTRACT

A spam filter system and method, for maintaining at least one database of permitted email addresses; automatically communicating with an email server, and selectively downloading and storing email not corresponding to entries in the database; automatically sending a challenge message in response to messages from non-permitted email addresses; if an appropriate response is received to the challenge message, adding the non-permitted email address to the database of permitted email addresses; and automatically restoring downloaded email messages from email addresses which become permitted.

20 Claims, 1 Drawing Sheet

SPAM FILTERING SYSTEM AND METHOD

RELATED APPLICATIONS

The present application claims benefit of priority from U.S. Provisional Application 60/820,022, filed Jul. 21, 2007, which is expressly incorporated herein by reference.

TECHNICAL FIELD

The present invention relates to computer software. More particularly, the invention is to directed to a system and method for identifying unsolicited and unwanted e-mail through a sender authentication/authorization filter that has been personalized for or by a user.

BACKGROUND OF THE INVENTION

Electronic messaging, particularly electronic mail ("e-mail") over the Internet, has became quite pervasive in society. Its ease of use, low cost, and integration with common office computer tools and business process work-flow make it a preferred method of communication for many individuals and organizations.

Unfortunately, as has occurred with more traditional forms of communication, such as a postal mail and telephone, e-mail recipients are being subjected to unsolicited mass mailings. With the explosion, particularly in the last few years, of Internet-based commerce, a wide and growing variety of electronic merchandisers are repeatedly sending unsolicited mail advertising their products and services, "phishing" for confidential information, pump-and-dump of small cap equities, transmission of an wanted or malicious software, other nefarious or unknown motivations. Most consumers who order products or otherwise transact with a merchant over the Internet expect to and, in fact, do regularly receive such solicitations from those merchants. However, electronic mailers are continually expanding their distribution lists to penetrate deeper into society in order to reach more people. In that regard, recipients who merely provide their e-mail addresses in response to requests for visitor information generated by various web sites, often later find that they have been included on electronic distribution lists. This occurs without the knowledge, let alone the assent, of the recipients. Moreover, as with postal direct-mail lists, an electronic mailer will often disseminate its distribution list, whether by sale, lease or otherwise, to another such mailer for its use, and so forth with subsequent mailers. Further, given the low cost of sending an e-mail message, automated processes which randomly generate e-mail addresses to existing domains, or derive e-mail addresses from various lists or databases, send massive floods of messages. Consequently, over time, e-mail recipients often find themselves increasingly barraged by unsolicited mail resulting from separate distribution lists maintained by a wide variety of mass mailers or spammers. Though certain avenues exist through which an individual might request that their name be removed from most e-mail lists from legally compliant entities, many sources of e-mail are not compliant, or use "loop-holes" in existing regulation.

Various proposals and systems have been implemented to generate "white lists" and "black lists" of individual senders, IP address, or domains. However, the normal e-mail protocols are susceptible to "spoofing", and therefore an analysis of the e-mail message may not properly reflect its origin. Likewise, spam may be sent from "zombie" machines, and thus exploit the infrastructure owned by others, who may be "white listed". Further, new domains are constantly being added, and thus a simple list-based filter generally precludes normal delivery of many messages that would be authorized by the recipient, and thus suffers from a very high false positive reject rate. Likewise, the spoofing of valid addresses raises the possibility, at least, of false negative rejections. This unsolicited mail usually increases over time. The sender can effectively block recipient requests or attempts to eliminate this unsolicited mail. For example, the sender can prevent a recipient of a message from identifying the sender of that message (such as by sending mail through a proxy server). This precludes that recipient from contacting the sender in an attempt to be excluded from a distribution list. Alternatively, the sender can ignore any request previously received from the recipient to be so excluded.

An individual can easily receive hundreds of pieces of unsolicited postal mail in less than a year. By contrast, given the extreme ease and insignificant cost through which e-distribution lists can be readily exchanged and e-mail messages disseminated across extremely large numbers of addresses, a single e-mail addressee included on several distribution lists can expect to receive a considerably large number of unsolicited messages over a much shorter period of time.

Furthermore, while many unsolicited e-mail messages are benign, such as offers for discount office or computer supplies or invitations to attend conferences of one type or another; others, such as pornographic, inflammatory and abusive material, are highly offensive to their recipients. All such unsolicited messages, whether e-mail or postal mail, collectively constitute so-called "junk" mail. To easily differentiate between the two, junk e-mail is commonly known, and will alternatively be referred to herein, as "spam".

Similar to the task of handling junk postal mail, an e-mail recipient may sift through his/her incoming mail to remove the spam. United States Patent Application 20040083270 (Heckerman, David; et al., Apr. 29, 2004) provides an intelligent, content-sensitive filtering process which responds to user feedback. See also, US 20040139160, 20040139165, 20040177110, 20040215977, expressly incorporated herein by reference. Simple (concrete) email filter classification systems are known. See, 20040193684, 20040199595, 20040210639, 20040205127, 20040205126, 20040210640 expressly incorporated herein by reference.

Drawbacks of many prior art systems and methods are that these systems either take time to setup and configure, or they do not allow the user sufficient flexibility to personalize the email filter.

See, also, expressly incorporated herein by reference:
20060149823 Electronic mail system and method
20060143271 Secure safe sender list
20060143136 Trusted electronic messaging system
20060129644 Email filtering system and method
20060122992 Software-type platform dedicated to internet site referencing
20060112166 System and method for disaster recovery and management of an email system
20060106790 Information handling mechanism
20060105750 Method and system for the prevention of unwanted wireless telecommunications
20060098650 Method and system for message delivery using a secure device and simple output without the use of a personal computer
20060093998 Method and apparatus for communication between humans and devices
20060092861 Self configuring network management system
20060089994 Concealing a network connected device
20060089924 Document categorisation system
20060085505 Validating inbound messages 20060083192 Communication traffic control methods and systems
20060080303 Method, apparatus, and computer program product for indexing, synchronizing and searching digital data
20060079255 Methods, systems, and computer program products for short message service (SMS) spam filtering using e-mail spam filtering resources
20060075052 Platform for Intelligent Email Distribution
20060075044 System and method for electronic contact list-based search and display
20060072144 Network scanner for global document creation, transmission and management
20060053203 Method for the filtering of messages in a communication network
20060047769 System, method and program to limit rate of transferring messages from suspected spammers
20060047766 Controlling transmission of email
20060041622 Spam filtering for mobile communication devices
20060036695 Timed delivery of alert notifications based on user set criteria
20060036693 Spam filtering with probabilistic secure hashes
20060031385 Reverse IP method and system
20060031373 Spam filter with sender ranking system
20060031338 Challenge response systems
20060031328 Electronic message distribution system
20060031319 Hiearchically verifying the identity of the sender of an e-mail message
20060031318 Communicating information about the content of electronic messages to a server
20060031314 Techniques for determining the reputation of a message sender
20060031307 System and method for filtering network messages
20060026242 Messaging spam detection
20060015942 Systems and methods for classification of messaging entities
20060015561 Incremental anti-spam lookup and update service
20060013191 Method, security system control module and policy server for providing security in a packet-switched telecommunications system
20060004896 Managing unwanted/unsolicited e-mail protection using sender identity
20050278620 Methods, systems, and computer program products for content-based screening of messaging service messages
20050267944 Email manager
20050267928 Systems, apparatus and methods for managing networking devices
20050266832 Value-added electronic messaging services having web-based user accessible message center
20050262210 Email analysis using fuzzy matching of text
20050262203 Email system with conversation-centric user interface
20050256866 Search system and methods with integration of user annotations from a trust network
20050251861 System and method for preventing delivery of unsolicited and undesired electronic messages by key generation and comparison
20050251486 System and methods for protecting digital works using a watermark gateway
20050234910 Categorizing and snoozing conversations in a conversation-based email system
20050234850 Displaying conversations in a conversation-based email sysem
20050228899 Systems and methods for producing, managing, delivering, retrieving, and/or tracking permission based communications
20050223326 Browser-based spell checker
20050223076 Cooperative spam control
20050223067 Providing snippets relevant to a search query in a conversation-based email system
20050223066 Displaying conversation views in a conversation-based email system
20050223058 Identifying messages relevant to a search query in a conversation-based email system
20050223057 Processing messages in a conversation-based email system
20050222985 Email conversation management system
20050210258 Cryptographic puzzle cancellation service for deterring bulk electronic mail messages
20050210106 System and method for detecting and filtering unsolicited and undesired electronic messages
20050204159 System, method and computer program to block spam
20050203800 System and method for compounded marketing
20050198508 Method and system for transmission and processing of authenticated electronic mail
20050198175 Systems and methods for optimizing dynamic mailings
20050198061 Process and product for selectively processing data accesses
20050197767 Smart answering machine
20050193429 Integrated data traffic monitoring system
20050193076 Collecting, aggregating, and managing information relating to electronic messages
20050193073 (More) advanced spam detection features
20050190758 Security groups for VLANs
20050187868 Method and system for consensual referrals using multimedia description of real estate transaction
20050177385 Method and system for customizing views of information associated with a social network user
20050171954 Selective electronic messaging within an online social network for SPAM detection
20050144279 Transactional white-listing for electronic communications
20050131961 Data repository and method for promoting network storage of data
20050131905 Data repository and method for promoting network storage of data
20050131904 Data repository and method for promoting network storage of data
20050131903 Data repository and method for promoting network storage of data
20050120118 Novel network server for electronic mail filter benchmarking
20050114652 End-to-end encryption method and system for emails
20050114533 Electronic message forwarding
20050114516 Systems and methods for automatically updating electronic mail access lists
20050102511 Locked e-mail server with key server
20050101306 Method and system for the prevention of unwanted wireless telecommunications
20050097321 System and method for a subscription model trusted email database for use in antispam
20050097319 System and method for managing a trusted email datastore
20050097170 Community-based green list for antispam
20050091364 Method and system for on-demand allocation of a dynamic network of services 20050091321 Identifying undesired email messages having attachments
20050086224 SYSTEM AND METHOD FOR COMPUTING A MEASURE OF SIMILARITY BETWEEN DOCUMENTS
20050086205 SYSTEM AND METHOD FOR PERFORMING ELECTRONIC INFORMATION RETRIEVAL USING KEYWORDS
20050081059 Method and system for e-mail filtering
20050080864 Processing rules for digital messages
20050080860 Phonetic filtering of undesired email messages
20050076241 Degrees of separation for handling communications
20050076240 Degrees of separation for handling communications
20050076084 Dynamic message filtering
20050064850 E-mail filtering services and e-mail service enrollment techniques
20050060643 DOCUMENT SIMILARITY DETECTION AND CLASSIFICATION SYSTEM
20050060535 Methods and apparatus for monitoring local network traffic on local network segments and resolving detected security and network management problems occurring on those segments
20050060417 Automated electronic personal preference & proxy network
20050060295 Statistical classification of high-speed network data through content inspection
20050055404 E-mail server registry and method
20050055232 Personal information system and method
20050048998 Handportable cellular telephone adapted to receive messages and a method for processing messages
20050044160 Method and software product for identifying unsolicited emails
20050033810 Interceptor for non-subscribed bulk electronic messages
20050030589 Spam fax filter
20050022031 Advanced URL and IP features
20050022008 Origination/destination features and lists for spam prevention
20050021649 Prevention of outgoing spam
20050015455 SPAM processing system and methods including shared information among plural SPAM filters
20050015454 Obfuscation of spam filter
20050015452 Methods and systems for training content filters and resolving uncertainty in content filtering operations
20050015448 Systems and methods for automatically updating electronic mail access lists
20050015432 Deriving contact information from emails
20050010644 High performance electronic message delivery engine
20040267893 Fuzzy logic voting method and system for classifying E-mail using inputs from multiple spam classifiers
20040260922 Training filters for IP address and URL learning
20040260778 Electronic message delivery with estimation approaches
20040260776 Advanced spam detection techniques
20040260764 Computer System Tools and Method for Development and Testing
20040255140 Data repository and method for promoting network storage of data
20040254988 Method of and universal apparatus and module for automatically managing electronic communications, such as e-mail and the like, to enable integrity assurance thereof and real-time compliance with pre-established regulatory requirements as promulgated in government and other compliance database files and information websites, and the like
20040243678 Systems and methods for automatically updating electronic mail access lists
20040225647 Display system and method
20040221062 Message rendering for identification of content features
U.S. Pat. No. 7,051,077 Fuzzy logic voting method and system for classifying e-mail using inputs from multiple spam classifiers
U.S. Pat. No. 7,010,526 Knowledge-based data mining system
U.S. Pat. No. 6,993,534 Data store for knowledge-based data mining system
U.S. Pat. No. 6,986,037 Electronic mail system with authentication/encryption methodology for allowing connections to/from a message transfer agent
U.S. Pat. No. 6,965,919 Processing of unsolicited bulk electronic mail
U.S. Pat. No. 6,931,433 Processing of unsolicited bulk electronic communication
U.S. Pat. No. 6,901,398 System and method for constructing and personalizing a universal information classifier
U.S. Pat. No. 6,842,773 Processing of textual electronic communication distributed in bulk
U.S. Pat. No. 6,816,884 System and method for creating conversationally-styled summaries from digesting email messages
U.S. Pat. No. 6,757,830 Detecting unwanted properties in received email messages
U.S. Pat. No. 6,701,440 Method and system for protecting a computer using a remote e-mail scanning device
U.S. Pat. No. 6,654,787 Method and apparatus for filtering e-mail
U.S. Pat. No. 6,650,890 Value-added electronic messaging services and transparent implementation thereof using intermediate server
U.S. Pat. No. 6,615,348 Method and apparatus for an adapted digital signature
U.S. Pat. No. 6,546,416 Method and system for selectively blocking delivery of bulk electronic mail
U.S. Pat. No. 6,421,709 E-mail filter and method thereof
U.S. Pat. No. 7,013,152 Method and an arrangement in a network for determining a zone in which a communication unit is connected
U.S. Pat. No. 6,999,577 Multi-user call waiting
U.S. Pat. No. 6,985,756 Method, apparatus and article to remotely associate wireless communications devices with subscriber identities and/or proxy wireless communications devices
U.S. Pat. No. 6,957,062 Method, apparatus and article to remotely associate wireless communications devices with subscriber identities and/or proxy wireless communications devices
U.S. Pat. No. 6,944,774 Data flow control unit
U.S. Pat. No. 6,928,455 Method of and apparatus for controlling access to the internet in a computer system and computer readable medium storing a computer program
U.S. Pat. No. 6,732,157 Comprehensive anti-spam system, method, and computer program product for filtering unwanted e-mail messages
U.S. Pat. No. 6,587,549 Device for automatically processing incoming electronic mail (=e-mail)

U.S. Pat. No. 6,336,117 Content-indexing search system and method providing search results consistent with content filtering and blocking policies implemented in a blocking engine The systems, methods and concepts disclosed in the above patents and patent applications may be used in conjunction with, or appropriate components substitute for and/or supplement the elements of the preferred embodiment of the invention disclosed herein-below, to the extent consistent therewith.

In light of the foregoing, there exists a need to provide a system and method that will enable the identification and classification of spam versus desired e-mail. Furthermore, there exists a need for a method of quickly and easily configuring and controlling the spam filter while still enabling the user to personalize the spam filter if they so desire, to further facilitate appropriately-restrictive filtering criteria while permitting appropriate and/or authorized e-mail to be delivered. Further there exists a need for a system and method of filtering spam that functions with minimal configuration while minimizing the false positive reject rate and protecting emails from desired senders from being lost.

BRIEF DESCRIPTION OF THE SEVERAL VIEWS OF THE DRAWING

The present invention is described in detail below with reference to the attached FIGURE in the drawing, wherein.

DESCRIPTION OF THE INVENTION

The present invention is directed to a method and system for use in a computing environment to implement a filter to restrict normal delivery of e-mail messages to a recipient. The system preferably employs a set of rule-bases, which filter received messages according to a predetermined protocol. A received message may pass, fail, or be subjected to further verification and/or challenge. Further, the classification is not limited to pass or fail, and thus multiple classifications are possible.

A first component of the system, called "SpamMonster", is a spam filter based on a white list/black list approach. When properly trained, it can achieve a 95%+rate of accuracy against spam, and a 98%+accuracy identifying friendly emails. All the emails it deletes, i.e., emails removed from the normal delivery protocol, are saved. These may be saved in an alternate email-box, database, file system, or the like.

SpamMonster is not an email client or server, and it can run on the email client computer, or any other system which is capable of interacting with the email server. It is based on the basic assumption that the mail spamming computers do not intelligently reply to emails, however, it can selectively filter email from auto-senders. The reason why spamming computers do not respond to emails is that they would require a much more considerable bandwidth and more resources, and in any case it should ignore these emails because they are likely due to invalid email addresses.

SpamOut uses the POP3 protocol and periodically "scans" emails that are waiting on an email server. Of course, in known manner, other email server protocols, such as IMAP, may be supported. When SpamMonster sees an email on the server, it saves a copy and applies a set of rules to it. There are three possible outcomes to the application of the rules:

The email is deleted from the server.
The email is deleted from the server, saved locally, and a registration reply is sent to the sender.
The email is left on the server.

The rules are applied by simple string matching between email fields and entries found in of the following 5 lists that are maintained jointly by the user and SpamMonster:

The Friends list
The Pre-Approved subjects list
The Undesireable senders list
The Undesireables subjects list
The Auto Senders list Of course, other type of rules and filtering may also be applied, in known manner, in conjunction with, or in place of, the above rules and other SpamOut components.

Figure 1:
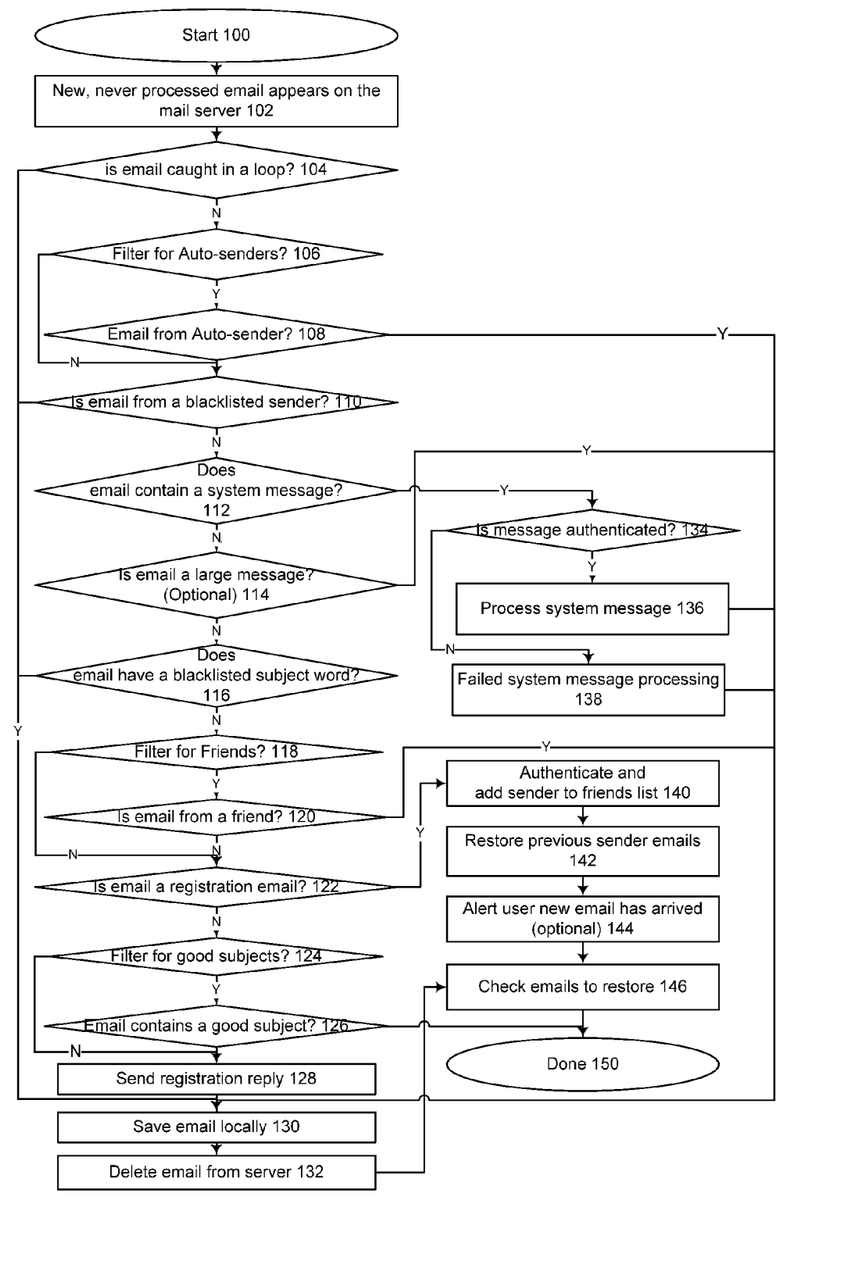
The FIGURE shows a flow chart diagram of a preferred embodiment of the invention.

As shown in the FIGURE, the system starts 100 by checking to see of there are new emails on the server 102. If a new email is found, it is initially processed to determine whether it is part of an email loop 104, that is, the response of the system to the email generates a response that requires similar processing by the system. The system implements a series of optional tests on the email, and thus the particular tests described hereinbelow, their order, and implementation, are exemplary, but not limiting, on the scope of the invention. A first test determines whether a filter is to be applied to the email, and a second test applies that filter. A first exemplary test is to determine whether an email is from an autosender 106, which if implemented, checks the email against known autosenders or for characteristics common to autosenders 108. If the email is from an authorized autosender, the remainder of the process is bypassed (Done 150), and the next email message is processed. A second exemplary test is to determine whether an email is from a blacklisted sender 110. A third exemplary test is to determine whether the email represents a system message 112 (other than a registration message), that is, a message intended for the system itself, and not for the user. If the message is not a system message, it is then optionally tested for size 114. A fourth exemplary test is whether the message is large, e.g., greater than 25 kB. A large message is rarely from a spammer, a large message may be delivered with low risk. A fifth exemplary test determines whether it contains a black-listed subject word 116. A sixth test determines if the email is from a friend 118. If the email is from an email address on the "Friends" list (whitelist), it is delivered 120. A seventh test determines whether the email is a registration email 122. If the email is not a registration email, the system sends a registration reply to invite the sender to register with the system 128. In each case where the email fails to qualify for delivery (email loop 104, blacklisted sender 110, blacklisted subject 116, awaiting registration 128) the email is saved locally (i.e., off of the mail server) 130, and deleted from the mail server 132. The system then checks whether there are emails to restore to the server 146 (based on successful qualification of a previously removed email), and completes its processing 150, waiting for new emails 102. If an email is a registration email 122, that is, a response to an invitation to become a friend 128, the sender of the email is added to the friends list 140, and previous emails from that sender are marked for restoration 142. Optionally, a user is notified whether there are new emails to review 144. After processing of the various emails, the emails marker for restoration are restored 146. If the email contains a system message 112, the message is authenticated 134, to ensure that the message is legitimate. If authenticated, the system message is processed 136. If the system message is not authenticated, the system message is not processed 138, and other steps may be taken, such as adding the sender to the blacklist, producing a system warning, producing a lockout (temporary or manually resettable) to impede an attack, or the like. System messages 136 (or messages which fail system message authentication 138) are saved locally, and removed from the server 132.

The Friends list indicates a set of preauthorized senders. Upon installation of SpamMonster, the user can populate this list with the email addresses (or part thereof) of the people he wants to receive emails from. This can also be filled automatically from an address book or email archive. As senders register themselves to SpamMonster by replying to a challenge email, SpamMonster will add such senders to the Friends list itself. It should be noted that the friends list does not need to be populated when SpamMonster is first installed, and the user can choose to let the list become populated as senders register themselves.

The Pre-Approved subjects list is a list of subjects that will make SpamMonster consider the email as friendly. One classic example of a word that can be used in this list is "order". When an order for goods is placed on the Internet, the vendor usually emails a copy of the order. By telling SpamMonster to accept all the emails where the word "order" appears on the subject line, the emails from these stores will not be rejected. It is noted that this list can have undesirable effects, since it potentially permits all spam with the word "order" in the subject field to effectively bypass the SpamMonster filtering. In addition to the simple string matching technology, a more intelligent content-based or activity-based filtering protocol may be implemented. For example, a filtering component may match a cache of visited web-sites with email from corresponding domains, to thus "match" an email confirming an order with the Internet activity which generated the order. Likewise, other sorts of intelligent or adaptive learning filtering schemes may be implemented.

The Undesirable senders list is a list of senders that are "black listed", and thus are bounced no matter what. Entries in that list could include specific political organizations, likely phishing threats, e.g., PayPal, on-line banks, etc., with which the recipient has no established relationship. Further, even of there is a relationship, the email could be scrutinized for the existence of hyperlinks to third party sites or IP addresses, different from the domain of the apparent email sender. During setup, an interview could inquire as to accounts maintained by the user. Often, these addresses will be the address of an email robot that replies to the registration emails. This list has priority over all the other rules, so that users on that list can not register to become authorized. Because accidental matches may make a recipient outright unreachable to people whose email addresses match the list, such listing preferably do not use wildcards or only Internet domains, but must match the full email addressee. For example, entering "de" to block pornographic emails from Denmark will also have the side effect of blocking emails from domains like "delta.com" and as such this list should include only entries including a full email addresses.

The Undesireable subjects list is a list of subjects the user wants bounced no matter what. Typical entries are words like mortgage (if you're not in the market for one), Xanax, Viagra, Cialis, etc. Like the Undesirable senders list, because accidental matches may make a recipient unreachable by people accidentally typing undesired subjects, it is preferred that entries be as complete as possible. This list can also have undesirable effects, and must also be used with caution.

The Autosenders list is a list that can be populated with known addresses and domains of autosenders, such as "postmaster" or "mailer" to prevent autoreplies to challenge messages from registering with the system.

The filtering rules are applied to each email on the next scheduled scan after it arrives on the server, according to the flow diagram shown in FIG. 1. Emails that do not have elements from one of the five lists are referred to as being from unknown senders. That will be the case of the majority of emails for the typical user. As seen in the flow chart, if an email is rejected for reasons other than being in a loop or having a blacklisted element, the email is saved locally and SpamMonster sends a "registration reply" also referred to as a challenge message, to the sender, similar to the following:

Subject: "Your last email to User Name needs confirmation"

"The email you sent to me earlier has been quarantined by my email filter (SpamMonster) because it does not know you. It must be the first time you have written to me since I have installed SpamOut on my computer.

Your email has not been lost, but I won't see it until you reply to the 'Your last email to Jean needs confirmation' email you just received.

You will have to do this only once. There is no need to resend your previous email, since I will receive it after you reply."

After successfully saving a copy of the email locally and sending the challenge message, the email is deleted from the server.

When generating the registration email for an unknown sender, SpamMonster may generate as part of the registration email Subject line an 8-character code that is unique to the computer it runs on. To that effect SpamMonster may use elements including but not limited to an Operating System, CPU, hard drive or other hardware serial number that is guaranteed to be unique. In order to be successful, a reply to the registration email (effectively a subscription) must have in its subject line that exact unique code. If it does not, it is an unauthorized attempt to subscribe, and the subscription does not succeed.

This ensures that only the senders specifically invited by the user's computer will be able to add themselves to the friends list. It protects against spammers mass-subscribing to all SpamMonster users with one email.

SpamMonster pays attention to emails received in short intervals with identical subject lines. That usually signifies that the automatic mode of SpamMonster is conversing with the automatic mode of some server, so SpamMonster stops sending registration emails.

SpamMonster scans all the subjects of incoming emails for the magic "Your last email to User Name needs confirmation" and the matching eight character code if one is being used. If the sender does as instructed and just replies to the registration email, SpamMonster will recognize this as a registration email and:

Add the user to the friends list

Restore all the previously saved emails from that sender by putting them back on the server Leave the reply to the registration email on the server so it gets retrieved.

When on a permanent (non-dial-up) Internet connection, SpamMonster is configured to loop. The SpamMonster system works better if the local email client does not check email regularly, since the two clients are competing for the messages on the server. Because SpamMonster can be configured to alert the user when an email is received, the user can then go and check his or her email with the email client. On the other hand, the spam filter may be synchronized to perform its tasks before the email client draws messages from the server. Thus, the auto-check feature may trigger SpamMonster first, and then immediately thereafter download the mails. SpamMonster may also be configured to cause the email client to check emails after it finishes a scan. It is also possible for an implementation of SpamMonster to operate on the local email archive, and thus filter the email after downloading.

When on an on-demand (phone modem) connection, it is best if the user runs SpamMonster upon connecting and before the running the email client, so SpamMonster can clean up the server before email is downloaded.

The argument has been made that by replying to a spam email may have the effect of "confirming" your email address to the spammer computer. However when one considers that 99% of the replies the spammer computer gets are "bounced" from mail servers because the addresses are expired and invalid, the email a spammer computer would end up "confirming" mostly invalid addresses, so the possibility is doubtful, and of limited adverse impact. Moreover, if an advanced spammer software assumes that any reply indicates a bad email address and updates its lists, SpamMonster may have the effect of actually removing one's email address from a spammer's list.

One implementation of SpamMonster, known as SpamOut is implemented as about 509 lines of Perl script. It leverages the power the Mail::POP3Client and Net::SMTP Perl modules to implement all the functionality described hereinabove.

An alternate implementation of SpamMonster provides a windows GUI and multi-threading. It is written in C++ to Win32 and its POP3 and SMTP classes directly use the MFC CSocket class. There are, of course, many other known implementation classes of the POP3 and SMTP protocols. The classes were enhanced with advanced logging, and because the MFC CSocket class does not have a timeout feature, the POP3 and SMTP classes have a watch dog algorithm running in a separate thread can sever communications after it identifies a timeout. It should be noted that other alternate implementations can be written in other languages such as Java, Visual C++, .Net, etc.

Although a GUI is not required to run SpamMonster, as demonstrated by the Perl implementation, in the interest of useability and simplicity of use, the main SpamMonster window is simple: a large toolbar and a list of emails. The window is resizeable, during which the columns are not resized in a uniform way, but according to the need of their content: some do not resize, others resize as a percentage of the total available area. The status bar shows information about the current communication, the time of the last scan and the current status (scanning or idle). Of course, after setup, the program runs silently, and does not require generally an interactive user interface. The software controls may also be conveniently accessible in a "taskbar", such as is generally at the bottom of a Windows Explorer user interface. Indeed, the user interface is separate from the application programming interface ("API") of the underlying engine, and therefore various types of interfaces or "shells" may be provided.

Before deleting an email, each and every email that is to be deleted by SpamMonster is saved locally, that is, on the machine on which SpamMonster executes, and as such these deleted emails can be restored by SpamMonster or otherwise recovered by the user. The user can inspect emails by right clicking on it and selecting the "Properties" option.

The SpamMonster system may also include the following features:
    IMAP and HTTP mail server protocols implementation
    The SpamMonster engine may run as a "service" (or a "deamon") under MS Windows or any other operating system that supports internet communications, instead of as an application. Thus, the preferred implementation of the SpamMonster system runs as a program or service under an operating system, interacting with the user through an API, which may be a graphic user interface, command line, task bar, or a remote communication interface, such as email, FTP, TCP/IP, SNMP, etc.
    SpamMonster may also be provided in the form of an appliance, similar to a router, which simply plugs into a network which intercommunicates with the email server. Such appliances typically run Linux, VM Works, or other embedded operating system, and may be combined with various network functions, such as firewall, router, wireless network access, network attached storage, FTP, email server, VPN, telephony, Radius server, etc. Advantageously, the appliance may have a USB port for external mass storage, such as to store an email archive, or include such functionality internally (e.g., flash memory or magnetic media). The device may employ a web server for providing a user interface, and for other purposes. Alternately, the system may operate without local storage, using a another machine on the network, or the email server itself, as the memory for storing removed emails.
    SpamMonster may also use available (e.g., Internet database) known spammers registries.
    Each list entry may have an expiration property: Thus, for example, an authorized sender entry may allow email from a given sender for only a limited time, after which a re-registration may be required.
    Each list entry may have a match property: This feature will be able to force an exact match for that list entry.
    Support for simple regular expressions in lists.
    SpamMonster may also be implemented in an "Enterprise version", aimed at the Corporate environment, with the SpamMonster engine running on a remote server, and thus a single SpamMonster engine instance can be used to filter spam, according to an individual set, common set, or hierarchal rules (some enterprise-wide rules, some individual rules, in an ordered scheme), for each mailbox separately. In this enterprise version, optionally, individual users may be given access to the GUI, or a limited-function GUI, to manage their own emails. In the case of a multi-user system, separate encryption of various accounts may be provided, and in a corporate environment, integration with document management, storage, and retrieval policies provided. Indeed, such policies may be directly implemented in the SpamMonster system, both for its own database of removed email messages, and for the email system(s) with which it interoperates. Therefore, the SpamMonster system may permit third party separately management email hosts to be integrated with corporate email asnd document management systems.
    SpamMonster may also respond to a remote user through commands sent through the email. For example, the owner of a computer running SpamMonster, while away can ask SpamMonster to do something by sending an email to a monitored account, and writing in the subject line of the email something like:
    [SM:###:@@@], where: ### is a private security password that can be set in the SpamOut Settings dialog; @@@ is the command you want SpamOut to execute.
    Since static passwords transmitted over the internet by email can be intercepted and read, this can compromise the security of the computer that is running SpamMonster with remote commands enabled, it may be desirable to have embodiments that provide security for this feature. To do this, these alternate embodiments use additional information to insure the email is coming from the sender. The following are some methods that can be used alone or in combination with each other to achieve this purpose. In some cases, this effectively requires special software on the sending computer. In other cases, a manual authentication is possible, permitting use of a standard text email client.

A dynamic password may be generated by combining a user password and a time-dependent function, such that the communication is only valid for a short period. For example, including another code similar to the eight digit code used in the anti-spoofing feature can be placed in the subject line or body of the email, in addition to or in place of the password. For purposes of this discussion, that code is referred to as the "security code." The security code is unique to the computer sending the email, and is generated by a utility from one or a combination of the processor serial number, hard drive serial number, MAC address, or unique hardware installed in the sending computer can be used. The code may be time-dependent and pseudorandom, and include a digital signature or hash of the message, so that interception of the email does not reveal sufficient information to compromise security. The hash or digital signature prevent an unauthorized user from changing the intended command.

The security code(s) for the computer(s) that the user wants to send commands from is/are entered into a list in Spam-Monster or generated automatically during an authentication/enrollment protocol. When SpamMonster receives an email with a command, it will only process the command if the security code matches a security code in the list. This insures the email is indeed coming from a computer that is authorized to send commands to the computer running SpamMonster.

The security of this method can be further enhanced by using the same utility that generates the security code on the computer sending the email. In this method, the security code, an encryption key and the time of day are used to generate another code on the fly, which is referred to in this discussion as the "date security code." The date security code indicates the time the email was sent. The user enters the security code and encryption key for each computer from which SpamMonster will accept commands, and indicates a time interval for commands to be valid. For example, if the user sets Spam-Monster to scan the server every five minutes, the user might set the security time interval in SpamMonster to 6 minutes. The user can then send an email with a command to Spam-Monster and SpamMonster will see it within the valid time range. When sending an email with a command, the utility is used to generate the date security code before sending the email, and this code is included in the email. When Spam-Monster receives an email with a command, it will test the date security code to the list of security codes and corresponding encryption keys and time in order to determine if the command was emailed from an allowed computer within the valid time range. This method results in a date security code that is different each time an email is sent, thereby preventing someone from copying and reusing the date security code, even within the permitted time. Under this method, the user can change the encryption key used by SpamMonster and the utility from time-to-time. To further enhance the security of this method, the algorithm used by SpamMonster and the utility to generate the security code and date security code and be stored externally to SpamMonster and the utility, and the algorithm itself can be changed from time-to-time. In this case, the algorithm must be changed on the computer running SpamMonster and all the computers that are allowed to send commands to SpamMonster. In some embodiments, Spam-Monster can be configured to use a different algorithm for each allowed computer.

One of the advantages of using a security code and date security code as discussed above is that if an allowed computer is lost or stolen, the user needs only remove its security code from the list in SpamMonster, and the lost or stolen computer can no longer process commands on the computer running SpamMonster.

Another method to insure an email with a command was sent by the user is to utilize a list of trusted IP addresses. In this method, trusted IP addresses are entered into a list in SpamMonster, and SpamMonster scans the header of the email to determine if the email with the command was sent from a trusted IP address. The command is processed only if there is a match. Likewise, other information in the message header can be used for this purpose.

SpamMonster can also use a rolling code authentication protocol to insure a email containing a command was actually sent by an authorized user, who may have an automatically generated or manual (printed) rolling code list.

Interactive challenge-response authentication may also be implemented, for example a cryptographic protocol, personal/private information queries (e.g., mother's maiden name, etc.), or the like. In order to subvert man-in-the-middle attacks, known cryptographic schemes may be employed.

When using an interactive authentication method, Spam-Monster can be configured to store commands in a queue, and send an authentication message when the number of commands in the queue reaches a predetermined number or when the user requests one. In this way, the user can send multiple commands and authenticate them all at once. This especially useful where the protocol limits the communication of multiple commands in a single message.

Yet another method of security is to maintain either a white list of commands that SpamMonster is allowed to process, or a black list of commands SpamMonster is not allowed to process.

These examples are not meant to be limiting, but to demonstrate that there are various ways to secure remote commands. From these examples, methods for securing remote commands will become obvious to a person skilled in the art.

Finally, SpamMonster can be programmed to send a reply to the sender of a command to indicate that SpamMonster has received and processed the command.

Typical supported commands are:
Ping (produces a response to the sender's address, to verify system operation. A status message may also be included in the response)
Shutdown (disables all or a portion of the system. Options include complete shutdown of the software, shutdown of filtering functions only, allowing other operations, such as remote commands, to continue operating, or shut down the computer on which the software executes)
Startup (in the case where remote commands remain operable, commences email filtering functions)
Addfriend:friendName (Adds a new friend to the friends list)
Run:externalCommand (This runs an external program on the computer where SpamOut is running. Generally, anything that can be typed on the command line of a DOS window can be entered here, including the name of a program with arguments, a URL, etc.). SpamMonster also filters these commands so that a hacker cannot execute malicious code on the user's computer.
Send:filepathname (replies to you with an email message which includes a copy of the file you specified. That allows you to retrieve any file from the computer where SpamMonster is running) Again, security is applied to these emails.
Directory:path (replies with a directory listing for a desired path)

DisableCommands (Tells SpamMonster to stop accepting remote commands until someone physically goes into SpamMonster Settings to re-enable the remote commands mechanism.)

This list is not meant to be limiting, but only to illustrate how SpamMonster enables a computer to be controlled by email.

If desired, multiple commands separated by a separator can be contained in one email.

The software may also respond to FTP and/or HTTP requests, and/or implement a local server using a standard or proprietary protocol.

As would be understood by those skilled in the art, the functions discussed herein can be performed on a client side, a server side or both. These functions could also be performed on any one or more computing devices, in a variety of combinations and configurations, and such variations are contemplated and within the scope of the present invention.

Additional aspects of the invention, together with the advantages and novel features appurtenant thereto, will become apparent to those skilled in the art upon examination of the foregoing. The objects and advantages of the invention may be realized and attained by means, instrumentalities and combinations particularly pointed out in the appended claims. The present invention has been described in relation to particular embodiments which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and within the scope of the claims.

What is claimed is:

1. A spam filter method, comprising:
   (a) maintaining at least one automated database of permitted email addresses, and non-permitted email addresses;
   (b) automatically communicating between an automated spam filter processor and an automated email server, over a computer communication network, wherein email messages are received by the email server and email messages on the email server are available for retrieval by user email clients;
   (c) selectively automatically downloading email messages from the automated email server to the automated spam filter processor over the computer communication network using a retrieve mail protocol;
   (d) storing the automatically downloaded email messages from the email server, not corresponding to entries in the database of permitted email addresses in a memory associated with the automated spam filter processor;
   (e) removing email messages not corresponding to entries in the database of permitted email addresses from the automated email server, wherein email messages corresponding to entries in the database of permitted email addresses are maintained on the automated email server;
   (f) automatically sending a challenge email message, by the automated spam filter processor, in response to a stored email message automatically downloaded from the email server from email addresses which are not non-permitted email addresses, to the non-permitted email address;
   (g) monitoring the automated email server, by the automated spam filter processor, for receipt of an appropriate response email message to the challenge email message, and if an appropriate response email message to the challenge email message is received, adding the respective email address associated with the appropriate response email message to the automated database of permitted email addresses;
   (h) automatically restoring removed email messages from email addresses which become permitted, from the memory, by the automated spam filter processor, to the automated email server over the computer communication network using a send mail protocol; and
   (i) analyzing email messages downloaded by the automated spam filter from the automated email server to determine presence of a system email message, distinct from any appropriate response email message, containing a valid authorization code, and if the email message is determined to contain a valid authorization code, extracting and executing a command sequence communicated in the system email message, the communicated command sequence including recognized commands adapted to at least one of: disable at least a portion of the automated spam filter processor, and add at least one email address to the database of permitted email addresses independent of receipt of any appropriate response email message to the challenge email message.

2. The method according to claim 1, wherein the valid authorization code is a dynamically changing code, and the communicated command sequence includes at least one recognized command to disable the automated spam filter processor.

3. The method according to claim 1, wherein the challenge email message contains a code which identifies the email message which triggered the challenge email message.

4. The method according to claim 2, wherein a time-dependent cryptographic process authenticates the communicated command sequence.

5. The method according to claim 2, wherein a rolling code cryptographic process authenticates the communicated command sequence.

6. The method according to claim 1, wherein a challenge-response interactive cryptographic process authenticates the communicated command sequence.

7. The method according to claim 1, further comprising the step of storing removed email messages in a database in said memory, wherein properties of individual email messages in the database can be inspected by a user.

8. The method according to claim 1, wherein the automated spam filter processor is implemented in a network appliance which communicates over the computer communication network using TCP/IP with the automated email server.

9. The method according to claim 8, wherein the network appliance further comprises a firewall, for filtering network packets.

10. The method according to claim 8, wherein the network appliance further comprises a network attached storage device, for filtering and archiving email messages.

11. The method according to claim 1, wherein the automated spam filter processor comprises a computer located remote from a corresponding automated email server.

12. The method according to claim 1, further comprising sending a confirmation email message, by the automated spam filter processor, that the communicated command sequence was executed.

13. A spam filter, comprising:
(a) at least one database of permitted email addresses and non-permitted email addresses;
(b) a hardware computer network communications port configured to communicate with an email server;
(c) a database of spam email messages;
(d) a hardware processor, configured to:
  (i) automatically communicate with the email server, selectively download email messages by communicating through the computer network communications port using a retrieve mail protocol, store retrieved email messages not associated with a permitted email address to the database of spam email messages, and remove email messages not associated with a permitted email address from the email server;
  (ii) automatically send a challenge email message to a source email address of an email message stored in the database of spam email messages not associated with a non-permitted email address;
  (iii) automatically monitor the email server for receipt of a response email message to the challenge email message;
  (iv) if an appropriate response email message is received to the challenge email message, automatically add the source email address associated with the email message which provoked the challenge email message to the database of permitted email addresses;
  (v) automatically restore a respective email message from the database of spam email messages to the email server if an associated source email address is added to the database of permitted email addresses, by communicating through the computer network communications port with the email server using a send mail protocol;
  (vi) automatically analyze email messages received by the email server, distinct from any response email message, for presence of an authorization code and a command for at least one of: adding an email address to the database of permitted email addresses independent of any response email message, and disabling at least a portion of the functions of the spam filter, communicated within a respective system command email message, and upon successful verification of the authorization code, to extract and execute the communicated command.

14. The spam filter according to claim 13, wherein the processor is further configured to maintain a blacklist of non-permitted email addresses to which challenge email messages are not sent.

15. The spam filter according to claim 13, wherein the challenge email message contains an identifier of a respective email message for which the challenge email message is generated.

16. The spam filter according to claim 13, wherein a time-dependent cryptographic process authenticates the communicated command.

17. The spam filter according to claim 13, wherein a rolling code cryptographic process authenticates the communicated command.

18. The spam filter according to claim 13, wherein a challenge-response interactive cryptographic process authenticates the communicated command.

19. A computer readable non-transitory storage medium, storing instructions for controlling a programmable device to implement a spam filter method, comprising:
(a) maintaining at least one database of permitted email addresses and non-permitted email addresses by a spam filter;
(b) automatically downloading a respective email message from an email server through a computer communications network using a retrieve mail protocol by the spam filter, the automated email server being available for user email clients, storing retrieved email messages not corresponding to entries in the database, and removing email messages from the email server not corresponding to entries in the database;
(c) automatically sending a challenge message by the spam filter, within a respective email message, in response to an email message stored in the database from an email address which is not a permitted email address;
(d) monitoring the automated email server by the spam filter for receipt of an appropriate response in an email message, and if an appropriate response is received to the challenge message, adding the respective email address of a sender of the respective email message for which an appropriate response is received to the database of permitted email addresses;
(e) automatically restoring removed email messages from email addresses added to the database of permitted email addresses by the spam filter, through the computer communications network. using a send mail protocol, to the email server, wherein the removed email messages are unavailable from the email server for the user email clients using the retrieve mail protocol, and the restored email messages are available from the email server for the user email clients using the retrieve mail protocol;
(f) automatically analyzing email messages downloaded from the email server distinct from any email messages containing an appropriate response, by the spam filter, to determine whether they contain an authorization code and a command communicated within a respective email message for execution by the spam filter, and upon verification of the authorization code, extracting and controlling an execution of the communicated command by the spam filter to least one of add an email address to the database of permitted email addresses independent of any appropriate response, and disable at least a portion of the functions of the spam filter.

20. The computer readable storage medium according to claim 19, the method further comprising generating a challenge message to a sender of the communicated command, receiving a confirmation message to the challenge message comprising secret information, and only if the secret information is authenticated, passing a message to an external process for execution of the communicated command.

* * * * *